(12) United States Patent  
Emongkonchai

(10) Patent No.: US 7,831,144 B2  
(45) Date of Patent: *Nov. 9, 2010

(54) FAST FAULT NOTIFICATIONS OF AN OPTICAL NETWORK

(75) Inventor: Adisorn Emongkonchai, Oakland, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 12/370,520

(22) Filed: Feb. 12, 2009

(65) Prior Publication Data

US 2009/0208201 A1 Aug. 20, 2009

Related U.S. Application Data

(63) Continuation of application No. 10/785,597, filed on Feb. 23, 2004, now Pat. No. 7,499,646.

(51) Int. Cl.
- *H04B 10/08* (2006.01)
- *H04B 17/00* (2006.01)
- *H04J 14/00* (2006.01)

(52) U.S. Cl. .................. 398/2; 398/7; 398/15; 398/49; 398/57

(58) Field of Classification Search .................. 398/2, 398/7, 15, 49, 57
See application file for complete search history.

(56) References Cited

U.S. PATENT DOCUMENTS

| 5,757,526 | A | 5/1998 | Shiragaki et al. |
| 6,266,168 | B1 | 7/2001 | Denkin et al. |
| 6,882,765 | B1 | 4/2005 | Erickson et al. |
| 2001/0038471 | A1 | 11/2001 | Agrawal et al. |
| 2002/0024690 | A1* | 2/2002 | Iwaki et al. .................. 359/110 |
| 2005/0013532 | A1* | 1/2005 | Heiles et al. .................. 385/16 |

(Continued)

FOREIGN PATENT DOCUMENTS

EP 1 003 300 A2 5/2000

(Continued)

OTHER PUBLICATIONS

Optical Safety Procedures and Requirements for Optical Transport Systems. ITU-T Recommendation 6.664 [online]. International Telecommunication Union, Mar. 2003 [retrieved on Jan. 18, 2007]. Retrieved from the Internet: <URL: http://www.itu.int/rec/T-REC-G.664/en>.

(Continued)

*Primary Examiner*—Nathan M Curs  
(74) *Attorney, Agent, or Firm*—Blakely, Sokoloff, Taylor & Zafman LLP

(57) ABSTRACT

A method and apparatus for fault notification in an optical network are described herein. In one embodiment, an exemplary process includes detecting at a node that at least a portion of a first unidirectional path of an optical circuit is down, where the first unidirectional path is originated from a first terminating node. In response to the detection, the node signals the first terminating node by removing at least a portion of light of a second unidirectional path in an opposite direction of the first unidirectional path of the optical circuit, to indicate a path between the node and the first terminating node is down. Other methods and apparatuses are also described.

15 Claims, 8 Drawing Sheets

U.S. PATENT DOCUMENTS

2005/0025481 A1  2/2005  Fukashiro et al.

FOREIGN PATENT DOCUMENTS

WO    WO 03/073652 A1    9/2003
WO    PCT/US2005/05397    6/2005

OTHER PUBLICATIONS

Rajiv Ramaswami et al., "Optical Networks, A Practical Perspective", Second Edition, Morgan Kaufmann Publishers, ISBN 1-55860-655-6, , 831 pgs., San Francisco, CA, USA, 2002.

* cited by examiner

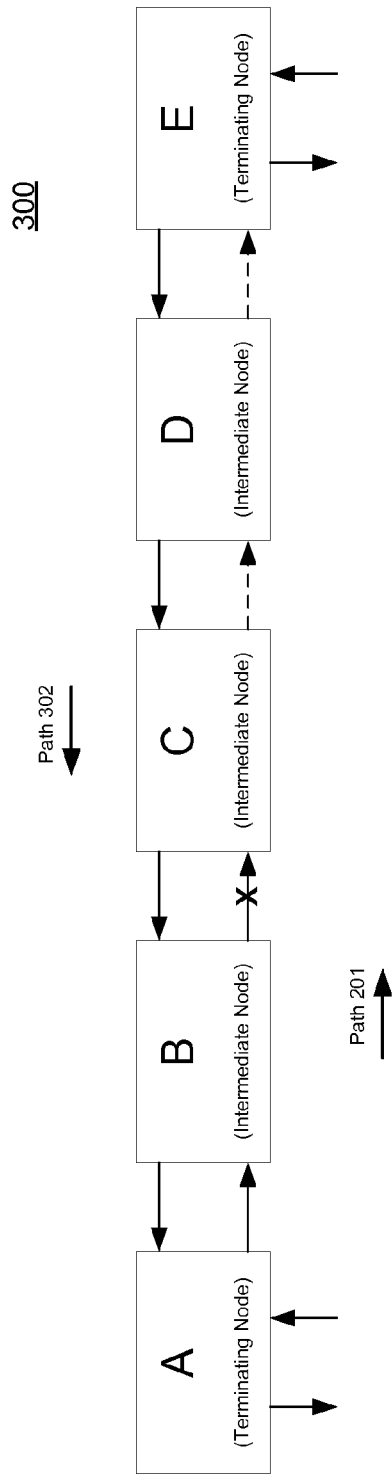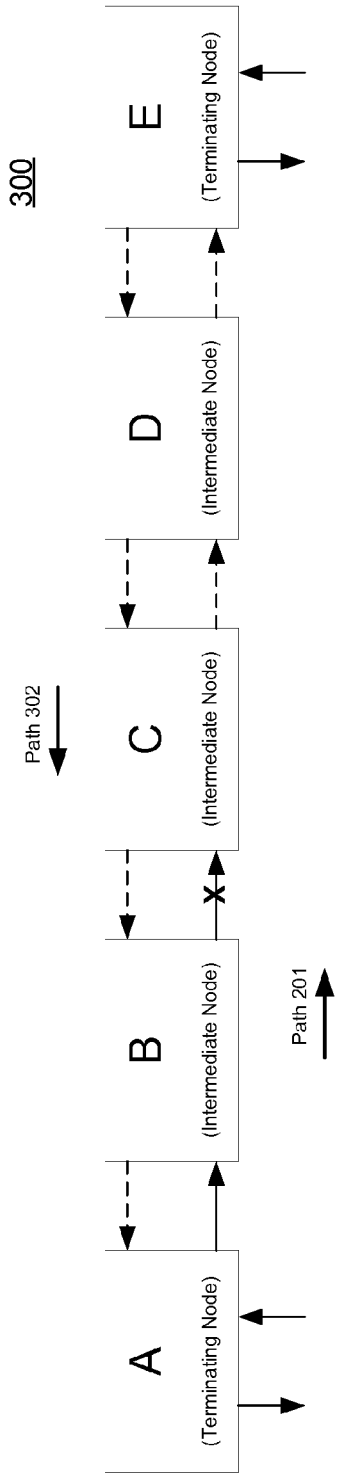
Fig. 3A
Fig. 3B

FAST FAULT NOTIFICATIONS OF AN OPTICAL NETWORK

This application is a continuation of U.S. patent application Ser. No. 10/785,597, filed Feb. 23, 2004 now U.S. Pat. No. 7,499,646, entitled "Fast Fault Notification Of An Optical Network", now issued as U.S. Pat. No. 7,499,646, and assigned to a common assignee of the present application. This application is also related to the issued U.S. Pat. No. 7,474,850, filed Feb. 16, 2005, entitled "Reroutable Protection Schemes Of An Optical Network" and assigned to a common assignee of the present application.

FIELD OF THE INVENTION

The present invention relates generally to the field of networking. More particularly, this invention relates to optical networking.

BACKGROUND OF THE INVENTION

An optical network has long enjoyed the sub-60 ms self-healing ring architecture. As the network grows, the ring topology is no longer suitable of its cumbersome provisioning and complex ring inter-working in a large network. The optical mesh network helps solve some of these issues. However, it suffers from a historically slow fault recovery time. The ring network is able to achieve sub-60 ms protection time because the fault detection and protection switching are performed locally where the fault occurred. In a mesh network, the fault recovery procedure is executed at the source and destination for end-to-end path protection. As a result, the fault notification time has contributed to slow recovery time for a mesh network.

Most optical transport networks today are based on electronic switching equipment which takes light as an input and converts the light into electronic data. It then processes the electronic data and converts them back to light. In order to carry the data, different types of framing protocol have been developed, such as, SONET (synchronous optical network), SDH (synchronous digital hierarchy), and OTN (optical transport network). The framing protocol uses a relatively small amount of bandwidth for its overhead data to carry framing information, error checking and monitoring, fault notification, and etc. For example, SONET AIS/RDI (alarm indication signal/remote defect indication) protocols may be used to notify terminating nodes of an optical circuit of the fault condition in the network.

An optical network is a collection of optical network devices interconnected by links made up of optical fibers. Thus, an optical network is a network in which the physical layer technology is fiber-optic cable. Cable trunks are interconnected with optical cross-connects (OXCs), and signals are added and dropped at optical add/drop multiplexers (OADMs). The optical network devices that allow traffic to enter and/or exit the optical network are referred to as access nodes; in contrast, any optical network devices that do not are referred to as pass-thru nodes (an optical network need not have any pass-thru nodes). Each optical link interconnects two optical network devices and typically includes an optical fiber to carry traffic in both directions. There may be multiple optical links between two optical network devices.

A given fiber can carry multiple communication channels simultaneously through a technique called wavelength division multiplexing (WDM), which is a form of frequency division multiplexing (FDM). When implementing WDM, each of multiple carrier wavelengths (or, equivalently, frequencies or colors) is used to provide a communication channel. Thus, a single fiber looks like multiple virtual fibers, with each virtual fiber carrying a different data stream. Each of these data streams may be a single data stream, or may be a time division multiplex (TDM) data stream. Each of the wavelengths used for these channels is often referred to as a lambda.

A lightpath is a one-way path in an optical network for which the lambda does not change. For a given lightpath, the optical nodes at which its path begins and ends are respectively called the source node and the destination node; the nodes (if any) on the lightpath in-between the source and destination nodes are called intermediate nodes. An optical circuit is a bidirectional, end-to-end (between the access nodes providing the ingress to and egress from the optical network for the traffic carried by that optical circuit) path through the optical network. Each of the two directions of an optical circuit is made up of one or more lightpaths. Specifically, when a given direction of the end-to-end path of an optical circuit will use a single wavelength, then a single end-to-end lightpath is provisioned for that direction (the source and destination nodes of that lightpath are access nodes of the optical network and are the same as the end nodes of the optical circuit). However, in the case where a single wavelength for a given direction will not be used, wavelength conversion is necessary and two or more lightpaths are provisioned for that direction of the end-to-end path of the optical circuit. Thus, a lightpath comprises a lambda and a path (the series of optical nodes (and, of course, the interconnecting links) through which traffic is carried with that lambda).

FIGS. 1A and 1B are block diagrams illustrating an optical circuit of a typical SONET/SDH based optical network. In the SONET/SDH world, AIS/RDI signals are generated by the first node that detects a failure of loss of signal (LOS) (e.g., a loss of an electrical signal) in order to suppress the alarms. Both AIS and RDI may be used as triggers to initiate a protection switch action. Note that because the SONET based network assumes that the signal is fully regenerated at each node, only one node would ever detect a LOS on its ingress. On the egress of that node, it would still send a framed SONET signal that contained null data with alarm information in its overhead. Downstream nodes would thus not detect a LOS but would see AIS in the overhead. The downstream node would associate defects related to that signal to the fault reported by an upstream node.

Referring to FIG. 1A, where there is a unidirectional path failure, the intermediate node C is the first node to detect such a failure. Since each of the nodes in the SONET/SDH based network regenerates signals at its respective egress. The downstream of the path (e.g., nodes D and E) still receive optical signals. Typically, in response to the detection, intermediate node C sends AIS signals to both downstream nodes to notify the fault conditions. The terminating node (e.g., node E) may return an RDI signal to its upstream nodes (e.g., nodes A-D) of the optical circuit.

In a case of bi-directional path failures, as shown in FIG. 1B, both nodes B and C send AIS signals to their respective downstream adjacent nodes (e.g., nodes D and A) for the notification purposes. The downstream nodes that receive such notification signals may rebroadcast the notification messages (e.g., an AIS signal) to its respective adjacent downstream nodes.

As a result, each of the intermediate nodes may be required to receive such notification messages, convert the optical notification messages into electrical signals, and regenerate another notification message to its adjacent nodes.

Photonic switching equipment (e.g., equipment that does not typically perform optical to electrical conversion of switching, with exception of adding and dropping traffic) used in all-optical networks, although not widely deployed yet, it is typically based on the GMPLS architecture. The GMPLS architecture also uses signaling protocols, such as RSVP-TE, to perform hop-by-hop data path establishment, removing, and fault notification. When a fault on a data path is detected, a fault notification message is sent hop-by-hop to the source and destination nodes. Such a notification relies on the transmission speed of the signaling channel which is typically 10/100 Mbps.

Such notification messages (e.g., AIS/RDI or RSVP-TE) may be queued during the transmission (e.g., particularly, during the signal conversions between the electrical domain and the optical domain). As the optical network grows, particularly, in a mesh optical network, such notification messages are getting larger and larger which put a heavy burden on the network traffic. As a result, the fault notification may be delayed significantly.

SUMMARY OF THE INVENTION

A method and apparatus for fault notification in an optical network are described herein. In one embodiment, an exemplary process includes detecting at a node that at least a portion of a first unidirectional path of an optical circuit is down, where the first unidirectional path is originated from a first terminating node. In response to the detection, the node signals the first terminating node by removing at least a portion of light of a second unidirectional path in an opposite direction of the first unidirectional path of the optical circuit, to indicate a path between the node and the first terminating node is down. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A and 3B are block diagrams illustrating an example of a wavelength division multiplex optical circuit according to another embodiment of the invention.

DETAILED DESCRIPTION

A method and apparatus for fault notification in an optical network are described herein. In one embodiment, instead of using a signal at each node receiving the fault notification that requires a conversion between an optical domain and an electrical domain (e.g., AIS/RDI or RSVP-TE) to detect a failure as in a conventional approach, the presence or absence of light corresponding to a wavelength of a path (path/wavelength), also referred to as a channel or a lambda, is used as an indication whether the respective path/wavelength is down or broken, to notify the terminating nodes of the path/wavelength of the optical circuit (e.g., the source and the destination nodes). Thus, the notification does not rely on a particular type of electronic framing or packet scheme. As a result, overall end-to-end path notification has been greatly improved.

In the following description, numerous specific details are set forth (e.g., such as logic resource partitioning sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "coupled" may also mean that two or more elements are not in direct contact with each other, but yet still co-operate or interact with each other.

Figure 1A:
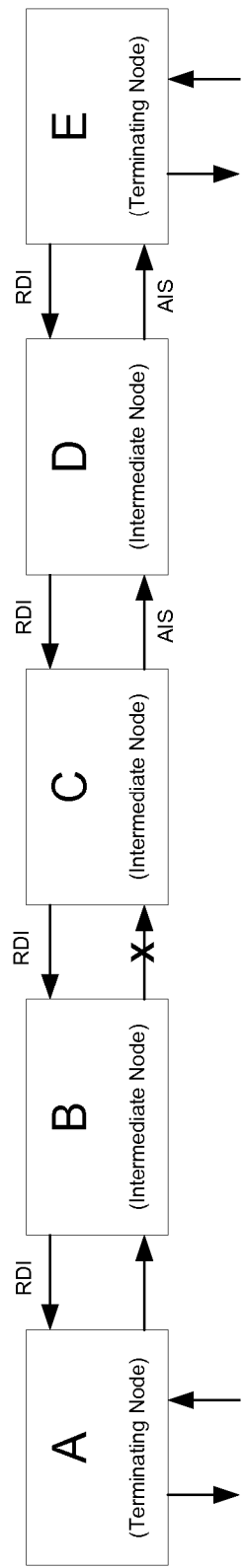
FIGS. 1A and 1B are block diagrams illustrating a typical SONET/SDH based fault notification of an optical network.
Figure 1B:
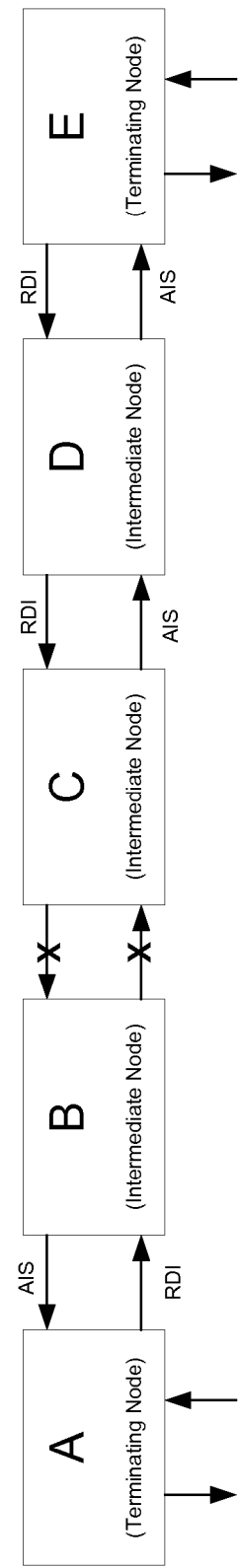
Figure 2A:
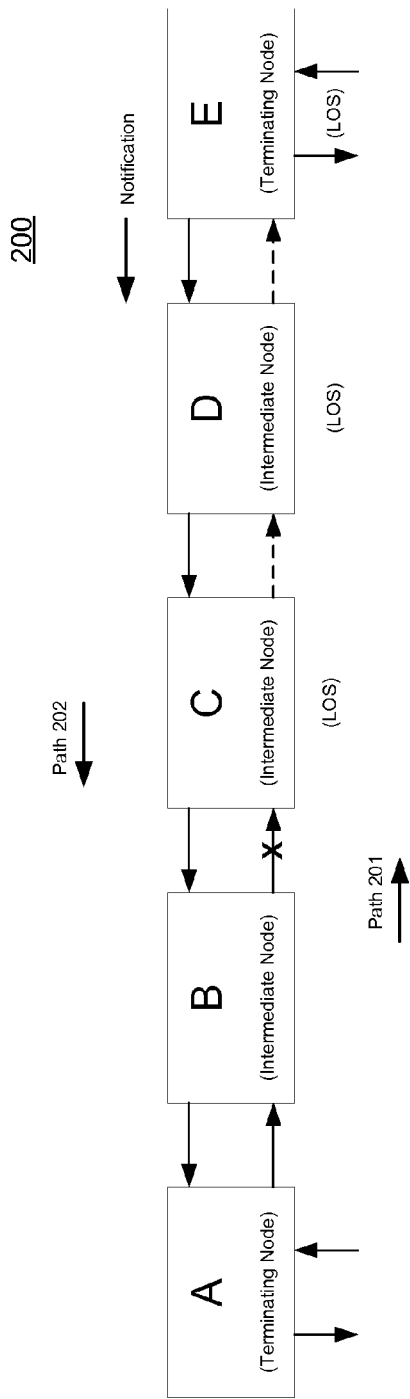
FIGS. 2A and 2B are block diagrams illustrating an example of a wavelength division multiplex optical circuit according to one embodiment of the invention.
Figure 2B:
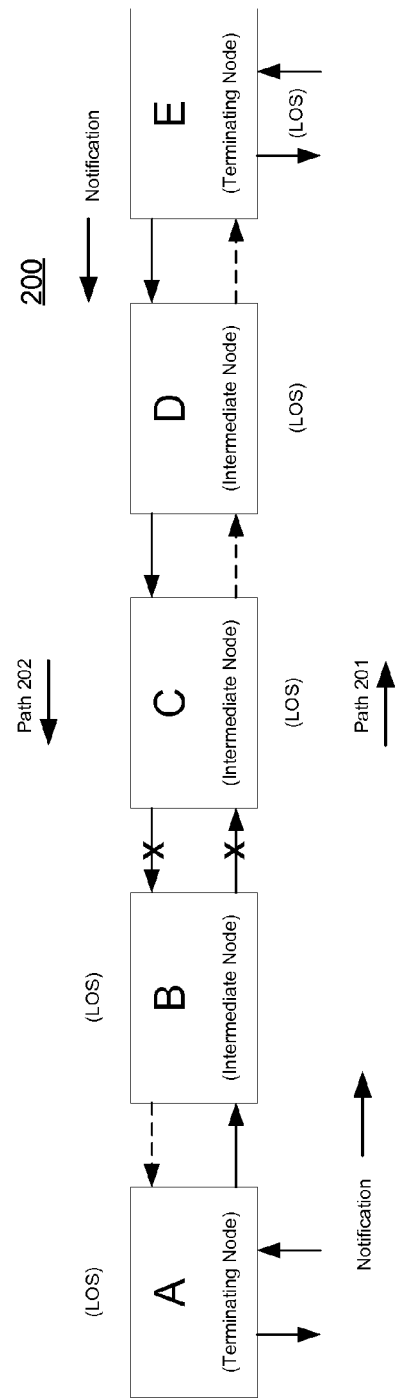

FIGS. 2A and 2B are block diagram illustrating an exemplary fault notification in an all-optical network according to one embodiment of the invention. In contrast to the SONET/SDH based optical network, AIS/RDI mechanisms may not be applied in a straightforward fashion to optically transparent networks. For example, if a fiber is cut, every downstream node will detect loss of signal (LOS) (e.g., loss of optical signals or loss of light). According to one embodiment of the invention, only terminating nodes generate AIS or RDI type signals.

Referring to FIGS. 2A and 2B, according to one embodiment, the exemplary optical circuit includes a unidirectional path 201 from terminating node A to terminating node E and unidirectional path 202 from terminating node E to terminating node A. Between terminating nodes A and A, there may be zero or more intermediate nodes, such as, for example, intermediate nodes B, C, and D. Paths 201 and 202 may be physically implemented within a single fiber with opposite directions. Alternatively, paths 201 and 202 may include multiple optical fibers. Each of the paths 201 and 202 may include multiple wavelengths, also referred to as channels or lambdas. For example, in a typical WDM (wavelength division multiplexing) network, each fiber may include up to 40 wavelengths. Alternatively, there may be up to 80 wavelengths in a DWDM (dense WDM) network. It will be appreciated that more or less wavelengths may be implemented within a fiber or a path. Terminating nodes A and E may be a source or a destination node of the optical circuit.

Referring to FIG. 2A, where there is a unidirectional path failure, exemplary optical circuit 200, as an example, includes terminating nodes A and E (also referred to as end nodes) and zero or more intermediate nodes B, C, and D in between. The exemplary optical circuit 200 may be a part of an optical ring network or an optical mesh network. It will be appreciated that more, less, or no intermediate nodes may be implemented between the terminating nodes A and E. In one embodiment, exemplary optical circuit 200 includes a unidirectional path 201 from terminating node A to terminating node E and a unidirectional path 202 from terminating node E to terminating node A. Paths 201 and 202 may be implemented within a single fiber. Alternatively, paths 201 and 202 may be implemented within different fibers. Terminating nodes A and E may be a source or a destination node of the optical circuit. The intermediate nodes B, C, and U may or may not be access nodes.

The unidirectional paths 201 and 202 may be established using a variety of techniques apparent to those with ordinary skill in the art. According to one embodiment, the unidirectional paths 201 and 202 may be established and provisioned based on a service level topology associated with the respective path or paths. Further detailed information concerning establishments and provisioning of the paths may be found in a co-pending U.S. Patent Published Application No. 2004/0247317, filed Jan. 9, 2004, entitled "A Method and Apparatus for a Network Database in an Optical Network", and assigned to a common assignee of the present application. The above-identified U.S. patent application is hereby incorporated by reference.

For illustration purposes, it is assumed that terminating node A is a source node of the optical circuit while terminating node E is a destination node of the optical circuit. In this example, path 201 may be referred to as a transmission path while path 202 may be referred to as a return path corresponding to the transmission path. When a failure occurs between the path from node B to node C, all downstream nodes (e.g., nodes C, D, and E) will detect LOS, where absence of signal is depicted as a dotted line. The failure may be resulted from a fiber failure, such as. for example, a fiber cut between nodes B and C. Alternatively, the failure may be resulted as a wavelength (e.g., a channel or a lambda) failure within the path, such as, for example, the malfunctioning laser device corresponding to that wavelength.

According to one embodiment, unlike the conventional approaches, where each intermediate node (e.g., nodes C and D) may be required to send a notification message (e.g., AIS/RDI or RSVP-TE protocols) to notify its respective adjacent nodes, only the terminating node E will respond to the LOS and generate a notification signal via path 202 to notify the opposite terminating node A, while the intermediate nodes (e.g., nodes B, C, and D) do not send notification messages in response to the detection of LOS.

In a case of bidirectional failure, as shown in FIG. 2B, the failures between nodes B and C are detected by the terminating nodes A and F because of LOS detected at the terminating nodes. Similar to the example of unidirectional failure illustrated in FIG. 2A, the intermediate nodes B, C, and D would not send any notification messages in response to the detected LOS. As a result, the detection and notification of the failures have been greatly improved.

FIGS. 3A and 3B are block diagram illustrating an example of a fault notification in an optical circuit of an all-optical network according to another embodiment of the invention. In one embodiment, exemplary optical circuit 300 includes multiple access nodes interconnected via one or more links. Each of the access nodes detects at a node, which may or may not be an access node, that at least a portion of a first unidirectional path of an optical circuit is down, the first unidirectional path being originated from a first terminating node, and signals the first terminating node by removing at least a portion of light of a second unidirectional path in an opposite direction of the first unidirectional path of the optical circuit, to indicate a path between the node and the first terminating node is down.

Referring to FIG. 3A, according to one embodiment, the exemplary optical circuit includes a unidirectional path 301 from terminating node A to terminating node E and unidirectional path 302 from terminating node E to terminating node A. Between terminating nodes A and F, there may he zero or more intermediate nodes, such as, for example, intermediate nodes B, C, and D. Paths 301 and 302 may be physically implemented within a single fiber with opposite directions. Alternatively, paths 301 and 302 may include multiple optical fibers. Each of the paths 301 and 302 may include multiple wavelengths, also referred to as channels or lambdas. For example, in a typical WDM (wavelength division multiplexing) network, each fiber may include up to 40 wavelengths. Alternatively, there may be up to 80 wavelengths in a DWDM (dense WDM) network. It wilt be appreciated that more or less wavelengths may be implemented within a fiber or a path. Terminating nodes A and E may be a source or a destination node of the optical circuit. The intermediate nodes B, C, and D may or may not be access nodes.

The unidirectional paths 301 and 302 may be established using a variety of techniques apparent to those with ordinary skill in the art. According to one embodiment, the unidirectional paths 301 and 302 may be established and provisioned based on a service level topology associated the respective path or paths, such as those illustrated in the above-identified incorporated co-pending patent application.

For illustration purposes, it is assumed that terminating node A is a source node of the optical circuit while terminating node E is a destination node of the optical circuit. In this example, path 301 may be referred to as a transmission path while path 302 may be referred to as a return path corresponding to the transmission path. When a failure occurs between the path from node B to node C, all downstream nodes (e.g., nodes C, D, and E) will detect a LOS (e.g., loss of light), where absence of signal is depicted as a dotted line. The failure may be resulted from a fiber failure, such as, for example, a fiber cut between nodes B and C. Alternatively, the failure may be resulted as a wavelength (e.g., a channel or a lambda) failure within the path, such as, for example, the malfunctioning laser device corresponding to that wavelength.

According to one embodiment, unlike the conventional approaches, where each intermediate node (e.g., nodes C and D) may be required to send a notification message (e.g., AIS/RDI or RSVP-TE protocols) to notify its respective adjacent nodes, only the terminating node E will respond to the LOS and remove at least a portion of the light of path 302 to notify the opposite terminating node A, while the intermediate nodes (e.g., nodes B, C, and D) do not send perform any notification in response to the detection of LOS. Unlike the embodiments illustrated in FIGS. 2A and 2B, the terminating node E, in this case, a destination node, turns off the light of the corresponding return path (e.g., path 302 as depicted as dotted lines shown in FIG. 3B) as a signal to notify the opposite terminating node A that at least a portion of path 301 or path 302 is down. In one embodiment, the light may be turned off by turning off the corresponding laser(s) or alternatively, by removing the corresponding photonic cross connect(s) associated with the path(s). Terminating node A, in this case, a source node, may be notified by not receiving an optical signal (e.g., light) of path 302. As a result, terminating node E does not have to convert the optical signal into an electrical signal to generate a notification signal, such as an AIS/RDI or RSVP-TE signal, to notify terminating node A.

Figure 4A:
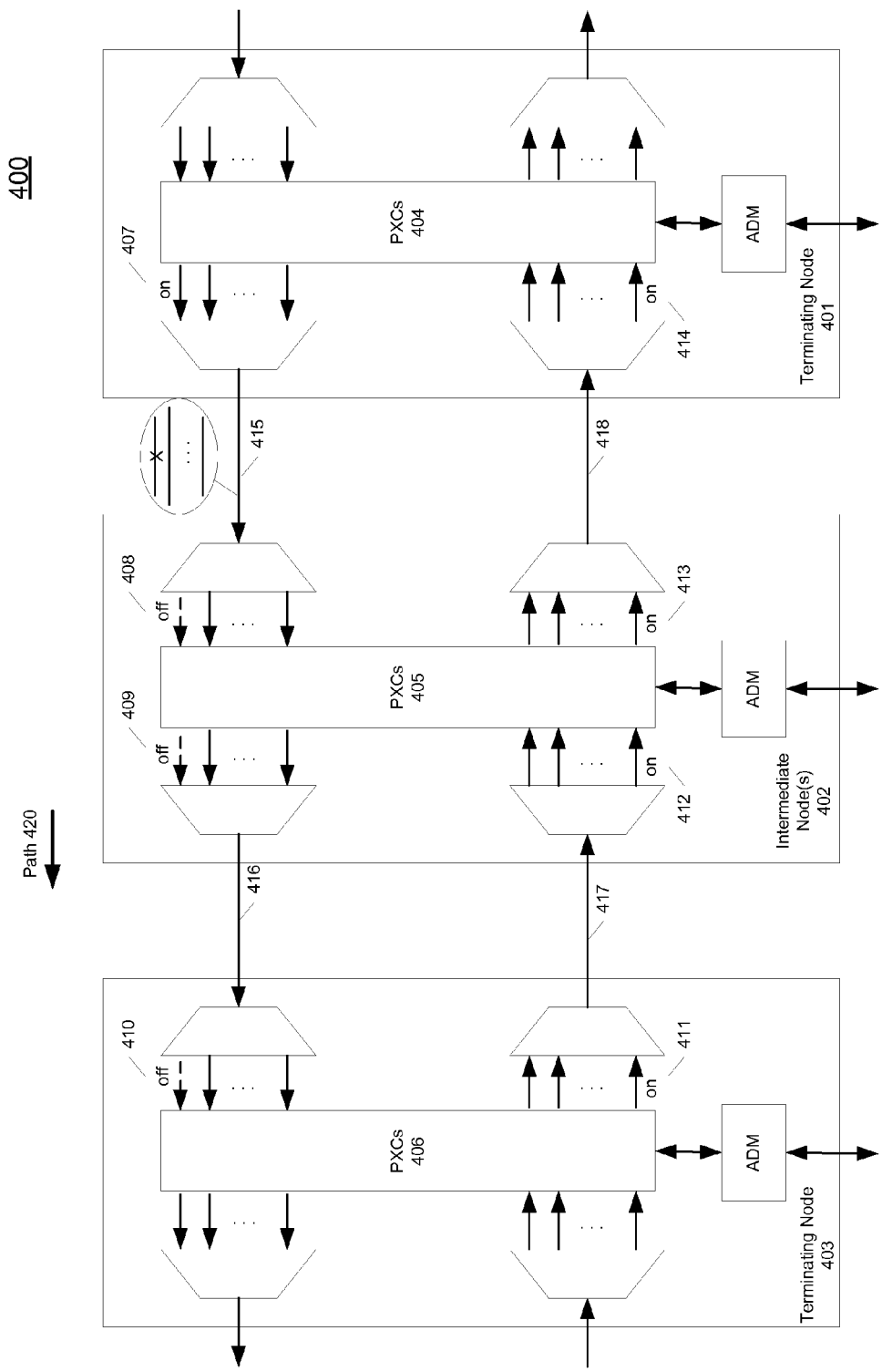
FIGS. 4A and 4B are block diagrams illustrating an example of a wavelength division multiplex optical circuit according to another embodiment of the invention.
Figure 4B:
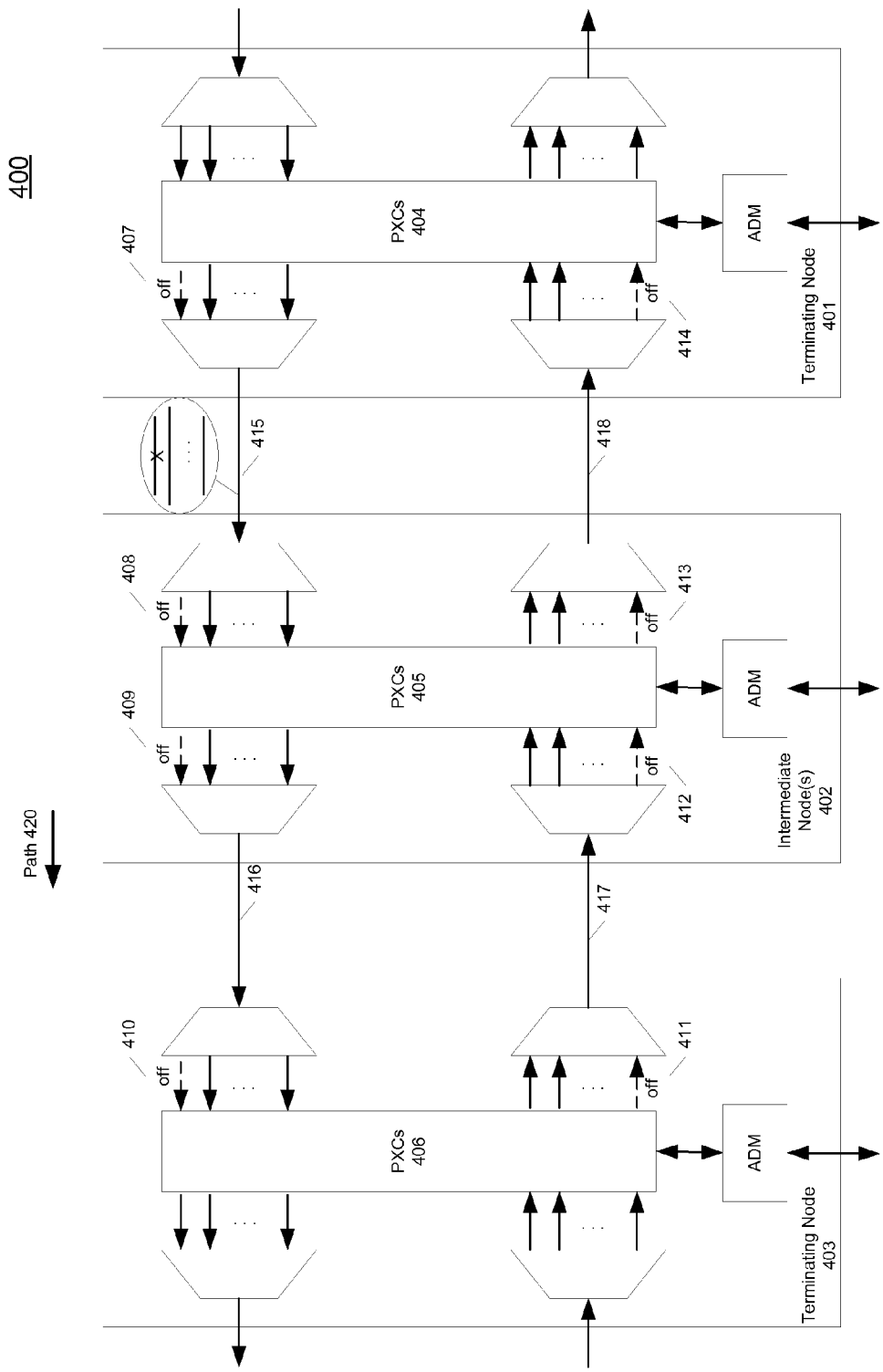

FIGS. 4A and 4B are block diagrams illustrating an example of a fault notification in an optical circuit of an all-optical network according to another embodiment of the invention. The exemplary optical circuit may be viewed as a detailed aspect of the embodiments shown in FIGS. 3A and 3B. According to one embodiment, in response to the detection of the LOS of a wavelength of a unidirectional path (e.g., path/wavelength), each of the downstream nodes checks whether the respective node is a terminating node of the optical circuit, such as, for example, a destination node of the optical circuit. If it is determined that the respective node is a terminating node of the optical circuit, the terminating node removes the light of a wavelength in an opposite direction with respect to the failed wavelength. In one embodiment, the light of the wavelength in the opposite direction may be removed by turning off the corresponding laser associated with the wavelength. Alternatively, the light may be removed by removing the corresponding photonic cross connect associated with the wavelength. As a result, the other terminating node at the other end of the optical circuit (e.g., the source node) will receive no light of that wavelength as an indication of a failed wavelength within the optical circuit.

Referring to FIG. 4A, in one embodiment, exemplary optical circuit 400 includes terminating nodes 401 and 403, and zero or more intermediate nodes 402. The terminating nodes 401 and 403 may be a source node or a destination node of the optical circuit. Each of the nodes 401-403 includes one or more photonic cross connects (PXCs) (e.g., PXCs 404 406) for switching traffic from the respective ingress port to an egress port. The nodes 401 403 of the optical circuit 400 are interconnected via one or more links. Each of the links may include one or more fibers and each fiber may include one or more wavelengths (also referred to as channels or lambdas), such as, for example, 40 wavelengths in a WDM network or 80 wavelengths in a DWDM network.

In this embodiment, for illustration purposes, it is assumed that terminating node 401 is a source node of the optical circuit 400 while terminating node 403 is a destination node of the optical circuit. Unidirectional path 420 from terminating node 401 to terminating node 403 may include one or more fibers 415 and 416. Unidirectional path 430 from terminating node 403 to terminating node 401 may include one or more fibers 417 and 418. Fibers 415-418 may be the same fiber having opposite unidirectional paths 420 and 430. Alternatively, fibers 415-418 may be different fibers. The one or more intermediate nodes 402 may or may not be access nodes.

In this example, path 420 may be referred to as a transmission path while path 430 may be referred to as a return path corresponding to the transmission path. When a failure of a wavelength of path 420 occurs between terminating node 401 and intermediate node 402, such as, for example, a wavelength of fiber 415 of path 420 is down as illustrated in the balloon), all downstream nodes (e.g., terminating node 403 and any of the intermediate nodes between the failure and that terminating node) will detect a LOS (e.g., loss of light), where absence of signal is depicted as a dotted line. The failure may be resulted from a wavelength (e.g., a channel or a lambda) failure within the path, such as, for example, the malfunctioning laser device corresponding to that wavelength.

In this example, the failed wavelength of path 420 (e.g., path/wavelength) is represented by wavelengths 407 to 410 across every nodes of the path 420. As a result of a failed wavelength of fiber 415, downstream nodes 403 and 402 will detect the LOS on wavelengths 408-410, as depicted as dotted lines. According to one embodiment, in response to the detection of LOS, each of the downstream nodes (e.g., terminating node 403 and zero or more intermediate nodes 402) checks whether the respective node is a terminating node of the optical circuit. If so, the terminating node will turn off the light of the corresponding wavelength of the unidirectional return path of the optical circuit.

In this example, since the one or more intermediate nodes 402 are not the terminating nodes of the optical circuit 400, the one or more intermediate nodes 402 will not performing signaling the terminating nodes of the optical circuit. However, when terminating node 403 detects the LOS, the terminating node 403 turns off the light of the corresponding wavelength (represented by wavelengths 411-414) of the unidirectional return path 430, as illustrated in FIG. 4B. As a result, terminating node 401 receives no light on the corresponding wavelength 414 of path 430. Since no notification messages or protocols are involved in this embodiment, there is no need to convert the optical signals to electrical signals in order to notify a terminating node concerning the failures of a wavelength of a path. As a result, a terminating node is notified in a much quicker manner. In one embodiment, the light of the wavelength in the opposite direction may be removed by turning off the corresponding laser associated with the wavelength. Alternatively, the light may be removed by removing the corresponding photonic cross connect associated with the wavelength. Other methods for removing at least a portion of light may be utilized within the scope of the embodiments of the invention.

Figure 5A:
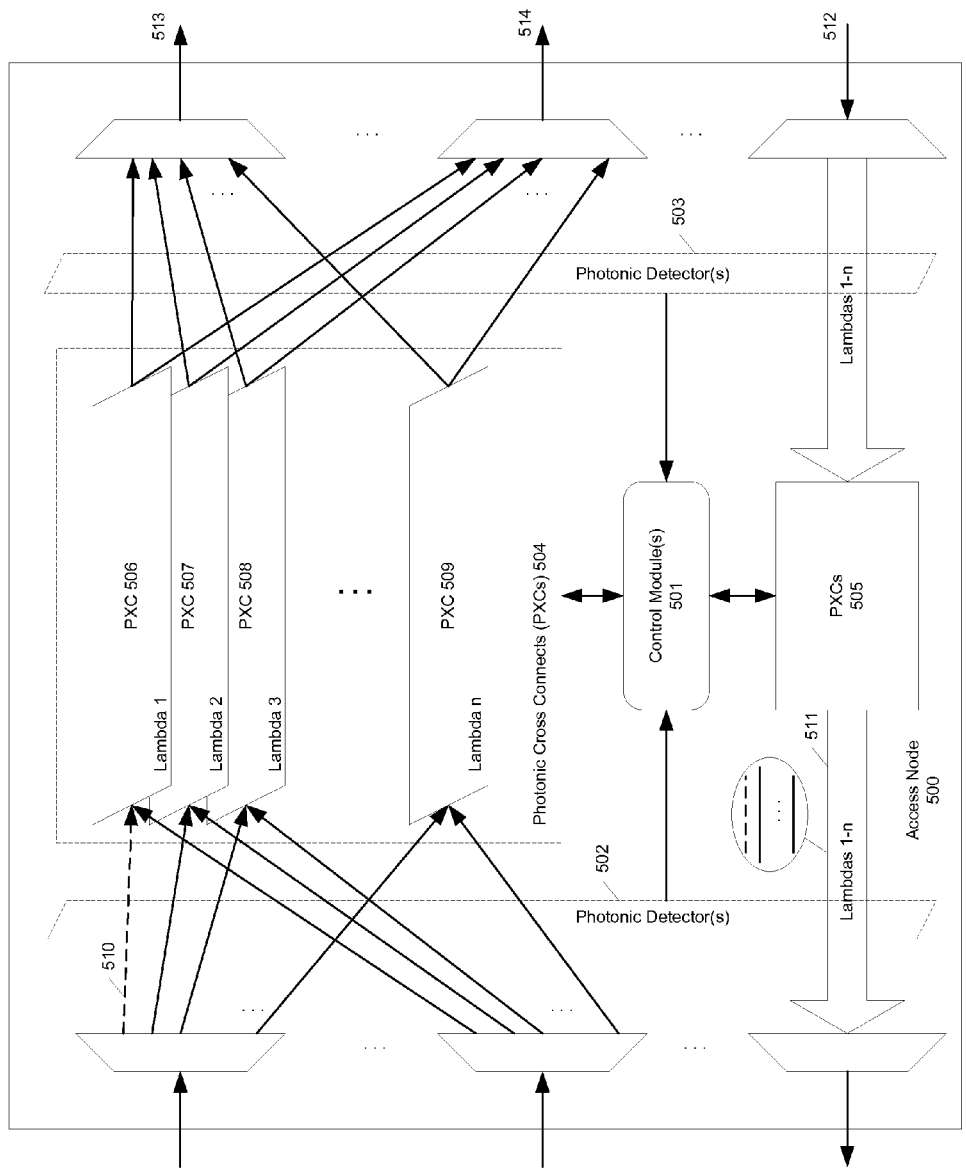
FIG. 5A is a block diagram illustrating an example of an access node of a wavelength division multiplex optical network according to one embodiment of the invention.

FIG. 5A is a block diagram illustrating an example of an access node of an all-optical network according to one embodiment of the invention. In one embodiment, exemplary access node 500 includes, but not limited to, a detection module to detect that at least a portion of a first unidirectional path of an optical circuit is down, the first unidirectional path being originated from a first terminating node, and a control module coupled to the detection module to signal the first terminating node by terminating at least a portion of light of a second unidirectional path in an opposite direction of the first unidirectional path of the optical circuit, to indicate that the first unidirectional path is down.

Referring to FIG. 5A, according to one embodiment, exemplary access node 500 includes one or more photonic cross connects (PXCs) 504 and 505 to provide cross connect services for the unidirectional or bi-directional traffic. Each of the PXCs includes one or more individual PXCs (e.g., PXCs 506-509) to handle cross connect services for each wavelength (e.g., lambda or channel). In addition, according to one embodiment, exemplary access node includes a control module 501 coupled to the PXCs 504 and 505, and one or more photonic detectors 502 and 503. The PXCs 504 and 505 may be the same PXCs for handling bi-directional traffic. In addition, the exemplary access node 500 includes one or more add/drop multiplexers (ADMs) (not shown) to allow traffic get on or off the respective optical circuit.

According to one embodiment, photonic detectors 502 and 503 may be used to detect whether there is a LOS on a wavelength. The detection may be performed on a wavelength basis. In one embodiment, the photonic detectors 502 and 503 may be photo diodes that can detect presence or absence of the light on a per wavelength basis. When a LOS of a wavelength is detected by the photonic detector, the photonic detector notifies the control module. According to one embodiment, the control module determines whether the access node is a terminating node of an optical circuit. If the access node is determined to be a terminating node of an optical circuit, the control module instructs a PXC to turn off a light of a wavelength in an opposite direction of the failed wavelength to notify the other terminating node of the optical circuit failure. Alternatively, the control module may alter the PXC or switch off the laser, etc. for the purposes of signaling.

For example, for illustration purposes, it is assumed that wavelength 510 is down or broken (e.g., a loss of light) as illustrated by a dotted line. As a result, a LOS detected by photonic detector 502. In response to the detection, photonic detector 502 notifies control module 501 regarding the status of wavelength 510. Control module 501 determines whether access node 500 is a terminating node of the optical circuit corresponding to the path/wavelength 510. If control module 501 determines that access node 500 is a terminating node of the optical circuit, control module 501 instructs PXCs 505 to turn off the light of the corresponding wavelength of a path in an opposite direction of the paths controlled by PXCs 504, as illustrated by a dotted line of the balloon of path 511. If control module 501 determines that access node 500 is not a terminating node of the optical circuit, control module 501 may simply ignore the detection with respect to the signaling the terminating nodes of the failure.

Similarly, photonic detector 503 may detect any wavelength of path 512 that has lost light. In return, photonic detector 503 may notify control module 501 regarding the LOS of the wavelength of path 512. If the access node 500 is a terminating node of the corresponding optical circuit, control module 501 may instruct the PXCs 504 to turn off the light of the corresponding wavelength in the opposite direction of path 512, such as, for example, a wavelength in at least one of paths 513 and 514, to notify the other terminating node of the corresponding optical circuit. In this manner, there is no need to convert the optical signals into electrical signals and use the notification packets (e.g., AIS/RDI or RSVP-TE) to notify the other terminating node (e.g., a source node). As a result, the speed of fault notification has been greatly improved. In one embodiment, the light of the wavelength may be removed by turning off the corresponding laser associated with the wavelength. Alternatively, the light may be removed by removing the corresponding photonic cross connect associated with the wavelength.

Figure 5B:
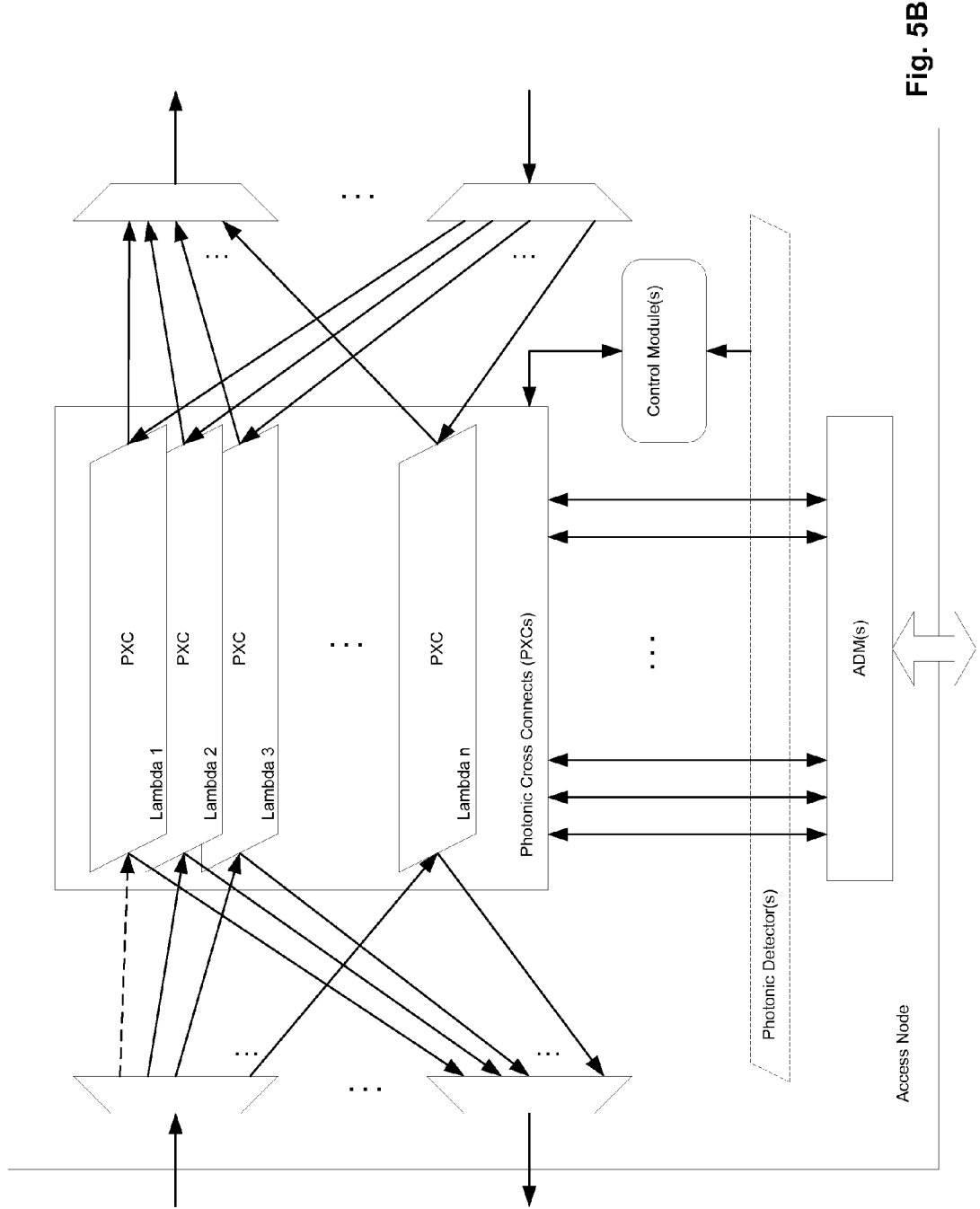
FIG. 5B is a block diagram illustrating an example of an access node of a wavelength division multiplex optical network according to an alternative embodiment of the invention.

Alternatively, according to another embodiment of the invention, the photonic detector may detect the loss of optical signals (e.g., loss of light) across the connections between the PXCs and the ADM, as shown in FIG. 5B. In this embodiment, the optical signals that are detected by the photonic detector are the optical signals terminated or originated at a terminating node of an optical circuit. That is, the optical signals of a non-terminating node would not be detected by the photonic detector because the optical signals are not terminated or originated at a non-terminating node. Therefore, when the phonotic detector, which is located between the PXC and the ADM, detects a loss of light at one or more path/wavelengths, the corresponding node would most likely a terminating node of the respective optical circuit. As a result, the node may not need to determine whether the corresponding node is a terminating node before responding the detection of the loss of light, because when the control module receives such a detection from the photonic detector, the corresponding node would most likely be a terminating node of the optical circuit. It will be appreciated that other configurations may exist.

Further detailed information concerning the exemplary nodes illustrated in FIGS. 5A and 5B can be found in issued U.S. Pat. No. 7,174,066, by Christopher M. Look, having an applicant's reference number of 8433P010, entitled "A Method And An Apparatus To Detect Signal Failure On A Per Wavelength Basis", filed Feb. 23, 2004, and assigned to a common assignee of the present application, which is hereby incorporated by reference.

Figure 6:
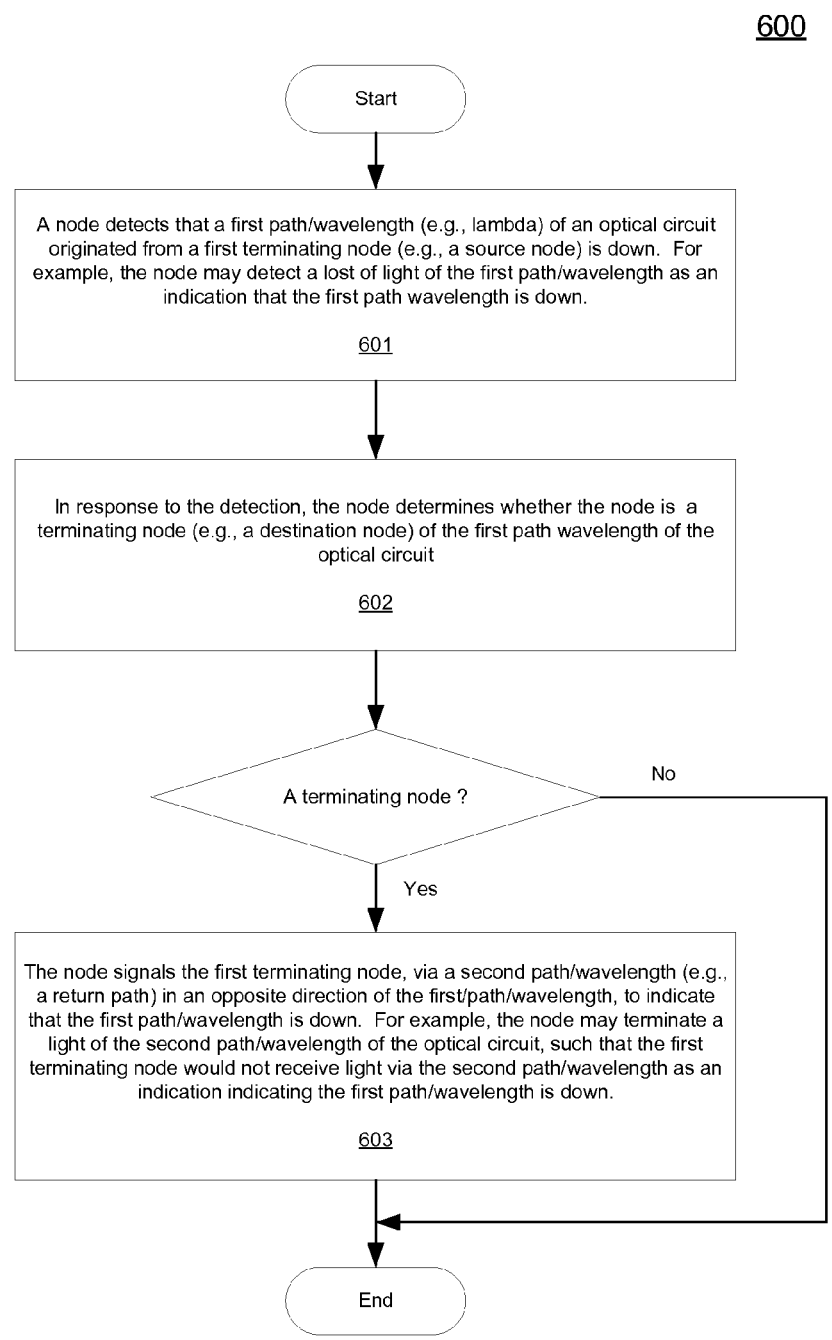
FIG. 6 is a flow diagram illustrating an example of a process for fault notification in a wavelength division multiplex optical network according to one embodiment of the invention.

FIG. 6 is a flow diagram illustrating an example of a process for fault notifications in an optical network according to one embodiment of the invention. Exemplary process 600 may be performed by a processing logic that may comprise hardware (circuitry, dedicated logic, etc.), software (such as is run on a dedicated machine), or a combination of both. In one embodiment, exemplary process 600 includes, but not limited to, detecting at a node that at least a portion of a first unidirectional path of an optical circuit is down, the first unidirectional path being originated from a first terminating node, and signaling the first terminating node by removing at least a portion of light of a second unidirectional path in an opposite direction of the first unidirectional path of the optical circuit, to indicate a path between the node and the first terminating node is down.

Referring to FIG. 6, at block 601, a node detects that at least a portion of a first unidirectional path of an optical circuit is down, where the first unidirectional path is originated from a first terminating node of the optical circuit, such as, for example, a source node. In one embodiment, the detection may be performed based on a per wavelength basis. For example, a node may detect that one or more wavelengths of the path (e.g., path/wavelength) are down. According to one embodiment, the node may detect the failed wavelength by detecting the loss of light of the respective wavelength as an indication of the failed wavelength.

In response to the detection, at block 602, the node determines whether the respective node is a terminating node of the optical circuit, such as, for example, a destination node of the optical circuit. In one embodiment, the determination is performed based on information related to the path containing the failed wavelength, which may be stored in a database maintained by the node. In the embodiment as shown in FIG. 5B, the determination of whether the node is a terminating node may not needed.

If the node is determined to be a terminating node of the optical circuit, at block 603, the node signals the first terminating node via a second wavelength of a path in an opposite direction of the failed path of the optical circuit to indicate the first path/wavelength is down. In one embodiment, the node turns off the light of the second path/wavelength, such that the first terminating node (e.g., the source node) would not receive the light of the second path/wavelength as an indication of the failure of the first path/wavelength. In one embodiment, the light of the second path/wavelength may be removed by turning off the corresponding laser associated with the second path/wavelength. Alternatively, the light may be removed by removing the corresponding photonic cross connect associated with the second path/wavelength. If the node is not a terminating node of the optical circuit (e.g., a destination node of the optical circuit), the node may simply ignore the detection of LOS of the first path/wavelength for the purposes of signaling the terminating nodes of the failure. Other operations apparent to those with ordinary skill in the art may be included.

Thus, A method and apparatus for fault notifications in an optical network have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a node of a wavelength multiplex optical network, the method comprising:
   detecting at the node that at least a portion of functionality of a wavelength of a first unidirectional path (first path/wavelength) of an optical circuit fails to operate, the first unidirectional path being originated from a first terminating node as a source node for reaching a second terminating node as a destination node of the first unidirectional path, the first terminating node and the second terminating node forming the optical circuit, wherein the optical circuit includes a nonterminating node;
   determining within the node whether the node is the second terminating node of the optical circuit in response to detecting a failure of the first unidirectional path;
   if it is determined that the node is the second terminating node of the optical circuit, the node signaling the first terminating node by removing a light of a second wavelength of a second unidirectional path (second path/wavelength) in an opposite direction of the first unidirectional path of the optical circuit, to indicate the failure of the first path/wavelength; and
   the node ignoring the failure of the first unidirectional path without removing the light of the second wavelength of the second unidirectional path if it is determined that the node is not the second terminating node of the optical circuit.

2. The method of claim 1, wherein the first terminating node is notified of the detection by not receiving at least a portion of the light of the second unidirectional path.

3. The method of claim 1, wherein the first unidirectional path is detected based on a loss el at least a portion of light of die first unidirectional path.

4. The method of claim 1, further comprising:
   detecting a wavelength of the first unidirectional path (first path/wavelength) is down; and
   signaling the first terminating node via a second path/wavelength of the second unidirectional path with respect to the status of the first path/wavelength.

5. The method of claim 4, wherein the first path/wavelength is detected based on a less of light of the first path/wavelength, and wherein the first terminating node is notified by not receiving the light of the second path/wavelength.

6. The method of claim 1, wherein the first and second unidirectional paths are within different fibers.

7. The method of claim 1, wherein the signaling is performed without converting optical signals of the first unidirectional path to electrical signals specifically used to signal the first terminating node that the path between the node and the first terminating node is down.

8. An apparatus, comprising:
   a node to be coupled to a wavelength division multiplex optical network, the node including,
      a detection module to detect that a wavelength of a first unidirectional path (first path/wavelength) of an optical circuit fails to perform, the first unidirectional path being originated from a first terminating node as a source node for reaching a second terminating node as a destination node of the first unidirectional path, the first terminating node and the second terminating node forming the optical circuit, wherein the optical circuit includes a non-terminating node, and
      a control module coupled to the detection module to determine whether the node is the second terminating node in response to detecting a failure of the first unidirectional path, and if it is determined that the node is the second terminating node, the control module is configured to signal the first terminating node by removing a light of a second wavelength of a second unidirectional path (second path/wavelength) in an opposite direction of the first unidirectional path of the optical circuit, to indicate the first path/wavelength is down, wherein the control module is configured to ignore failure of the first unidirectional path without removing the light of the second wavelength of the second unidirectional path if it is determined that the node is not the second terminating node.

9. The apparatus of claim 8, wherein the first terminating node is notified of the detection by not receiving at least a portion of light of the second unidirectional path.

10. The apparatus of claim 8, wherein the first unidirectional path is detected based on a loss of at least a portion of light or the first unidirectional path.

11. The apparatus of claim 8, wherein the detecting nodule detects a wavelength of the first unidirectional path (first path/wavelength) is down, and wherein the control module signals the first terminating node via a second wavelength of the second unidirectional path (second path/wavelength) with respect to the status of the first path/wavelength.

12. The apparatus of claim 11, wherein the first path/wavelength is detected based on a loss of light of the first path/wavelength, and wherein the first terminating node is notified by not receiving the light of the second path/wavelength.

13. The apparatus of claim 8, wherein the first and second unidirectional paths are within different fibers.

14. The apparatus of claim 8, wherein the detection module signals the first terminating node without converting the respective optical signals of the first unidirectional path to electrical signals specifically used to signal the first terminating node that the path between the node and the first terminating node is down.

15. A wavelength multiplex optical network, comprising:
   a plurality of nodes interconnected via one or more links, each of the plurality of nodes to
   detect that at least a portion of functionality of a wavelength of a first unidirectional path (first path/wavelength) of an optical circuit fails to operate, the first unidirectional path being originated from a first terminating node as a source node for reaching a second terminating node as a destination node of the first unidirectional path, the first terminating node and the second terminating node forming the optical circuit, wherein the optical circuit includes a non-terminating node;

determine whether the node is the second terminating node of the optical circuit in response to detecting a failure of the first unidirectional path;

if it is determined that the node is the second terminating node of the optical circuit, signal the first terminating node by removing a light of the second wavelength of a second unidirectional path (second path/wavelength) in an opposite direction of the first unidirectional path of the optical circuit, to indicate the failure of the first path/wavelength; and ignore the failure of the first unidirectional path without removing the light of the second wavelength of the second unidirectional path if it is determined that the node is not the second terminating node the optical circuit.

* * * * *